United States Patent
Sågfors et al.

(10) Patent No.: US 7,724,656 B2
(45) Date of Patent: May 25, 2010

(54) UPLINK CONGESTION DETECTION AND CONTROL BETWEEN NODES IN A RADIO ACCESS NETWORK

(75) Inventors: Mats Sågfors, Kyrkslätt (FI); Peter Lundh, Skärholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 846 days.

(21) Appl. No.: 11/035,021

(22) Filed: Jan. 14, 2005

(65) Prior Publication Data

US 2006/0159016 A1    Jul. 20, 2006

(51) Int. Cl.
*G01R 31/08* (2006.01)
*G06F 11/00* (2006.01)
*G08C 15/00* (2006.01)
*H04J 1/16* (2006.01)
*H04L 1/00* (2006.01)
*H04L 12/26* (2006.01)
*H04L 12/28* (2006.01)

(52) U.S. Cl. .................. 370/229; 370/230; 370/236; 370/328

(58) Field of Classification Search ......... 370/229–236, 370/352, 389, 395, 311, 329, 323, 333; 455/515, 455/513; 709/232
See application file for complete search history.

(56) References Cited

U.S. PATENT DOCUMENTS 6,233,222 B1 * 5/2001 Wallentin ................. 370/229
6,657,963 B1 * 12/2003 Paquette et al. ............ 370/236

(Continued)

FOREIGN PATENT DOCUMENTS

WO    WO 02/43429    5/2002
WO    WO 2004/028181    4/2004

OTHER PUBLICATIONS

3GPP TS 25.435 V5.7.0 (Mar. 2004) $3^{rd}$ Generation Partnership Project; Technical Specification Group Radio Access Network; UTRAN $1_{ub}$ Interface User Plane Protocols for Common Transport Channel data streams (Release 5).

(Continued)

*Primary Examiner*—Ricky Ngo
*Assistant Examiner*—David Oveissi
(74) *Attorney, Agent, or Firm*—Nixon & Vanderhye P.C.

(57) ABSTRACT

Congestion in a radio access network (RAN) associated with transporting uplink information originating from one or more mobile terminals is detected. That detected RAN congestion is reduced using any suitable technique (several examples are described) and may be implemented in one or more nodes in the RAN. One advantageous (but non-limiting) application is to a RAN that supports high speed uplink packet access (HSUPA) and/or one or more enhanced uplink dedicated channels (E-DCHs).

29 Claims, 5 Drawing Sheets

U.S. PATENT DOCUMENTS

| | | | |
|---|---|---|---|
| 6,889,050 B1* | 5/2005 | Willars et al. | 455/452.2 |
| 7,292,825 B2* | 11/2007 | Beale et al. | 455/67.11 |
| 2002/0173314 A1 | 11/2002 | Hwang et al. | |
| 2003/0218974 A1* | 11/2003 | Zuniga | 370/229 |
| 2005/0043035 A1* | 2/2005 | Diesen et al. | 455/454 |
| 2005/0249148 A1* | 11/2005 | Nakamata et al. | 370/328 |
| 2006/0030345 A1* | 2/2006 | Jain et al. | 455/515 |
| 2006/0031563 A1* | 2/2006 | Sebire et al. | 709/232 |
| 2006/0135189 A1* | 6/2006 | Nagaraj et al. | 455/513 |
| 2008/0084822 A1* | 4/2008 | Sagfors et al. | 370/235 |

OTHER PUBLICATIONS

Notification of Transmittal of the International Search Report and the Written Opinion of the International Searching Authority, or the Declaration for PCT/SE2006/000032 dated Apr. 21, 2006.

$3^{rd}$ Generation Partnership Project; technical Specification Group Radio Access Network; Iub/Iur Congestion Control; (Release 6), 3GPP TR 25.902 V1.0.0, Jun. 2005.

3GPP TS 25.427 Version 6.1.0, Dec. 2004, $3^{rd}$ Generation Partnership Project; Technical Specification Group Radio Access Network; UTRAN Iub/Iur interface user plane protocol for DCH data streams (Release 6), pp. 1-36.

* cited by examiner

UPLINK CONGESTION DETECTION AND CONTROL BETWEEN NODES IN A RADIO ACCESS NETWORK

TECHNICAL FIELD

The technical field relates to mobile data communications, and more particularly, to regulating uplink communications from mobile radio terminals in a radio access network.

BACKGROUND AND SUMMARY

There is an ever increasing demand for wireless communication devices to perform a variety of applications. Some of those applications require substantial bandwidth. For example, next generation wireless communication systems may offer high speed downlink packet access (HSDPA) and high speed uplink packet access (HSUPA) to provide enhanced data rates over the radio interface to support Internet access and multimedia type applications.

The enhanced uplink concept currently being considered in the $3^{rd}$ Generation Project Partnership (3GPP) intends to introduce substantially higher peak data rates over the radio interface in the uplink direction. Enhanced uplink data communications will likely employ fast scheduling and fast hybrid automatic repeat request (HARQ) with soft combining in the radio base station. Fast scheduling allows the radio base station to control when a wireless terminal is transmitting in the uplink direction and at what data transmission rate. Data transmission rate and transmission power are closely related, and scheduling can thus also be seen as a mechanism to vary the transmission power used by the mobile terminal for transmitting over an enhanced uplink channel. Neither the amount of uplink data to be transmitted nor the transmission power available in the mobile terminal at the time of transmission is known to the radio base station. As a result, the final selection of data rate will likely be performed in the mobile terminal. But the radio base station can set an upper limit on the data rate and/or transmission power that the mobile terminal may use to transmit over an enhanced uplink data channel.

Although the primary focus of enhanced uplink is on the radio interface performance and efficiency, the "bottleneck" may well occur further upstream from the radio interface in the transport of the uplink information between nodes in the radio access network (RAN). For example, the available uplink bit rate over the interface between a radio base station node in the RAN and a radio network controller node in the RAN (referred to as the Iub interface) may be a fraction of the available uplink bit rate over the radio interface. In this situation, high speed uplink packet access may overload the Iub interface between the radio base station and the radio network controller during peak bit rates. FIG. 1 illustrates that even though the downlink HSDPA bit rate over the radio interface is higher than the uplink HSUPA bit rate, the available bandwidth for high speed packet access data between the radio network controller and the radio base station is even less than the uplink HSUPA bit rate. The dashed line representing Iub High Speed Packet Access (HSPA) bandwidth limit is lower that the HSDPA and HSUPA bandwidths.

Consider the following simple example. A radio base station (sometimes referred to as a "Node B" using 3GPP terminology) controls three cells that have an enhanced uplink data transmission capability. Assume that the radio base station is connected to a radio network controller using one 4 Mbps link to support the enhanced uplink data transmitted from the radio base station and the radio network controller. Assume that the enhanced uplink capability may be up to 4 Mbps per cell. In this situation, enhanced uplink communication data from three cells at or near capacity cannot be transported from the radio base station to the radio network controller over the single 4 Mbps link. The result is a congested or overload situation. This congestion could result in long delays and loss of data, which reduces quality of service.

One possible solution to avoid this kind of overload situation would be to "over provision" the bandwidth resources in the radio access network for communications between radio network controllers and radio base stations. But this is inefficient, costly, and in some existing mobile communications networks, not practical. For high speed downlink, an HSDPA flow control algorithm could be employed by the radio base station to reduce the available downlink HSDPA bit rate to a level that suits the Iub interface bandwidth. But this control methodology cannot be employed in the opposite uplink direction because, as explained above, the amount of uplink data to be transmitted from mobile terminals is not known to the radio base station. Should the uplink enhanced bit rate over the radio interface significantly exceed the Iub uplink bandwidth, congestion will likely occur with long delays and possibly lost or otherwise corrupted data frames. What is needed, therefore, is a way to detect and then control an overload or other congested situation in the radio access network as a result of uplink mobile terminal communications being transported between nodes in the radio access network.

The technology described herein meets this need as well as other needs. Congestion associated with transporting in the RAN uplink information originating from one or more mobile terminals is detected. That detected congestion is then reduced using any suitable technique(s) and may be implemented in one or more nodes in the RAN. One advantageous (but non-limiting) application is to a RAN that supports high speed uplink packet access (HSUPA) and/or one or more enhanced uplink dedicated channels (E-DCHs). Uplink congestion may be detected over an interface between a radio network controller and a radio base station (the Iub interface) and/or an interface between radio network controllers (the Iur interface).

Although congestion reduction may be performed in any suitable fashion, one example approach is to reduce a parameter associated with a bit rate at which uplink mobile terminal information is transported through the RAN. For example, where the uplink mobile terminal information is communicated using uplink data flows, the bit rate parameter may be reduced by reducing a bit rate of one or more uplink data flows. It may be appropriate to limit the bit rate of the one or more uplink data flows actually causing the congestion in the RAN; alternatively, the bit rate of one or more lower priority uplink data flows may be reduced.

There are a number of different ways that the bit rate parameter may be reduced. For example, a bit rate parameter value may correspond to an absolute bit rate parameter value or a relative bit rate parameter value sent to one or more mobile terminals, e.g., a maximum bit rate or transmission power or a percentage or fraction of a current bit rate or transmission power. Another approach is to reduce the bit rate parameter using a capacity limitation message. If the RNC detects a congested condition in the RAN, it can send a capacity limitation to a radio base station, which then schedules uplink transmissions from mobile terminals to effect that capacity limitation, e.g., by using scheduling grants or credits.

In some situations, more drastic measures may be necessary to reduce the bit rate parameter such as dropping one or more frames of one or more uplink mobile terminal communications. In soft/softer handover situations, one or more of the diversity handover links may be released to reduce the bit rate parameter. Another technique employs sending negative acknowledgment messages for received packets back to the mobile terminal causing the mobile terminal to retransmit those negatively acknowledged packets. This effectively reduces the uplink bit rate through the RAN.

The congestion control may be implemented by sending control information either over a separate control signaling channel or in a user data plane where the control signaling is sent along with the data over a data channel.

DETAILED DESCRIPTION

In the following description, for purposes of explanation and non-limitation, specific details are set forth, such as particular nodes, functional entities, techniques, protocols, standards, etc. in order to provide an understanding of the described technology. For example, one advantageous applications is to enhanced uplink communications in accordance with 3GPP specifications. But other applications and other standards may be employed. It will apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Figure 2:
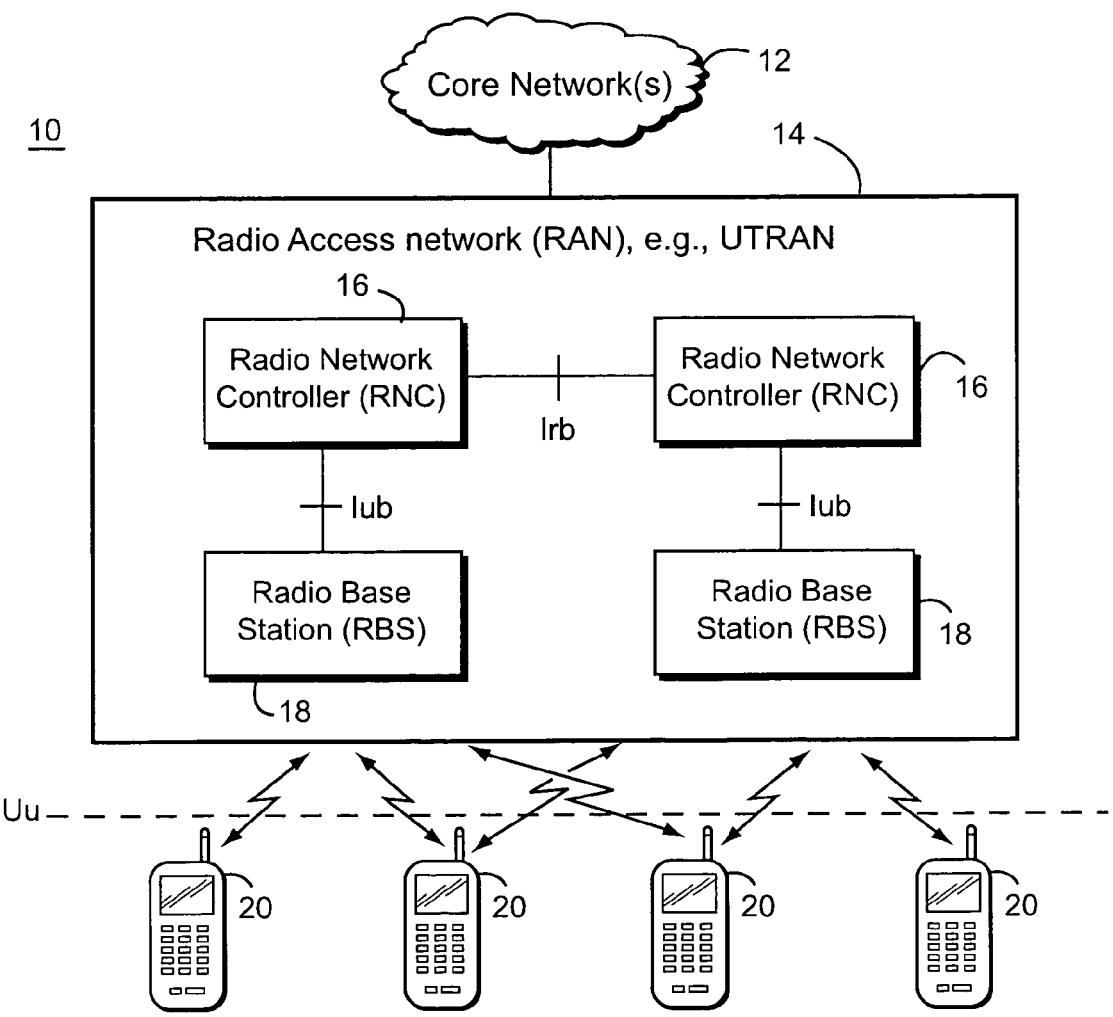
FIG. 2 is a block diagram of a mobile communications system including an example radio access network (RAN)

Referring to FIG. 2, an example network 10 that supports wireless communications is illustrated. Network 10 may accommodate one or more standard architectures including a universal mobile telecommunications system (UMTS) and other systems based on code division multiple access (CDMA), GPRS/EDGE and other systems based on time division multiple access (TDMA) systems, etc. In CDMA, different wireless channels are distinguished using different channelization codes or sequences, (these distinct codes are used to encode different information streams), which may then be modulated at one or more different carrier frequencies for simultaneous transmission. A receiver may recover a particular stream or flow for the receive signal using the appropriate code or sequence to decode the received signal. In TDMA, the radio spectrum is divided into time slots. Each time slot allows only one user to transmit and/or receive. TDMA requires precise timing between the transmitter and the receiver so that each user may transmit its information during its allocated time slot.

The network 10 includes a radio access network (RAN) 14 and one or more core network(s) 12. One example radio access network is the UMTS terrestrial access network (UTRAN) used in third generation cellular systems. Core network 14 typically supports circuit-based communications as well as packet-based communications. The RAN 14 includes one or more radio network controllers (RNCs) 16. Each RNC is coupled to one or more radio base stations (RBSs) 18 sometimes referred to as Node B's. The communications interface between Node Bs and RNCs is referred to as the Iub interface, and the communications interface between RNCs is referred to as the Iur interface. Transport of information over the Iub and Iur interfaces is typically based on asynchronous transfer mode (ATM) or Internet Protocol (IP). Wireless terminals 20 (referred to hereafter as mobile terminals) communicate over an air or radio interface with the RAN 14. The radio interface is referred to as the Uu interface. The two center mobile terminals are shown communicating with both RBSs 18.

Figure 3:
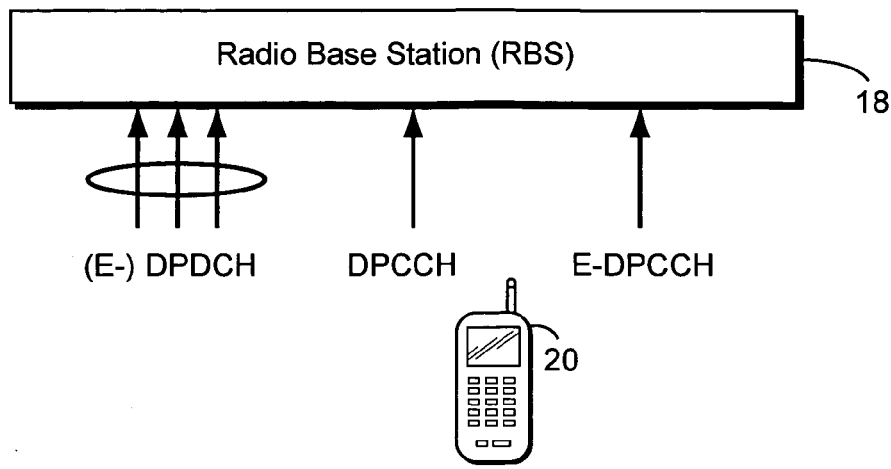
FIG. 3 is a diagram illustrating various uplink chancels used by mobile terminals for communicating over the radio/air interface with the RAN.

Although attention has recently been paid to high speed downlink packet access (HSDPA), there is increasing interest in high speed uplink packet access (HSUPA), also referred to as "enhanced uplink" and as enhanced uplink dedicated channel (E-DCH). Enhanced uplink employs several uplink channels from each mobile terminal with an active uplink connection as illustrated in FIG. 3. The enhanced dedicated physical data channel (E-DPDCH) carries enhanced uplink data (at higher bit rates), in addition to the normal dedicated physical data channels (DPDCHs) used for regular uplink data communication. The dedicated physical control channel (DPCCH) carries pilot symbols and out-of-band control signaling. Out-of-band control signaling related to enhanced uplink, e.g., uplink scheduling requests, may be carried on the enhanced dedicated physical control channel (E-DPCCH).

Figure 1:
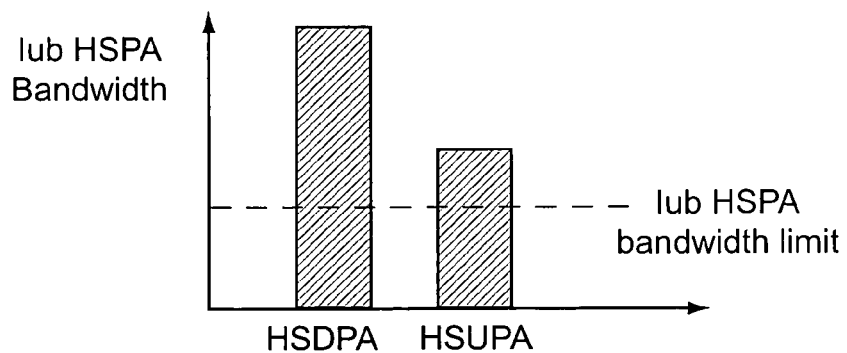
FIG. 1 is a graph illustrating the high speed packet access bandwidth for both the uplink and downlink directions as compared to the RAN bandwidth.
Figure 4:
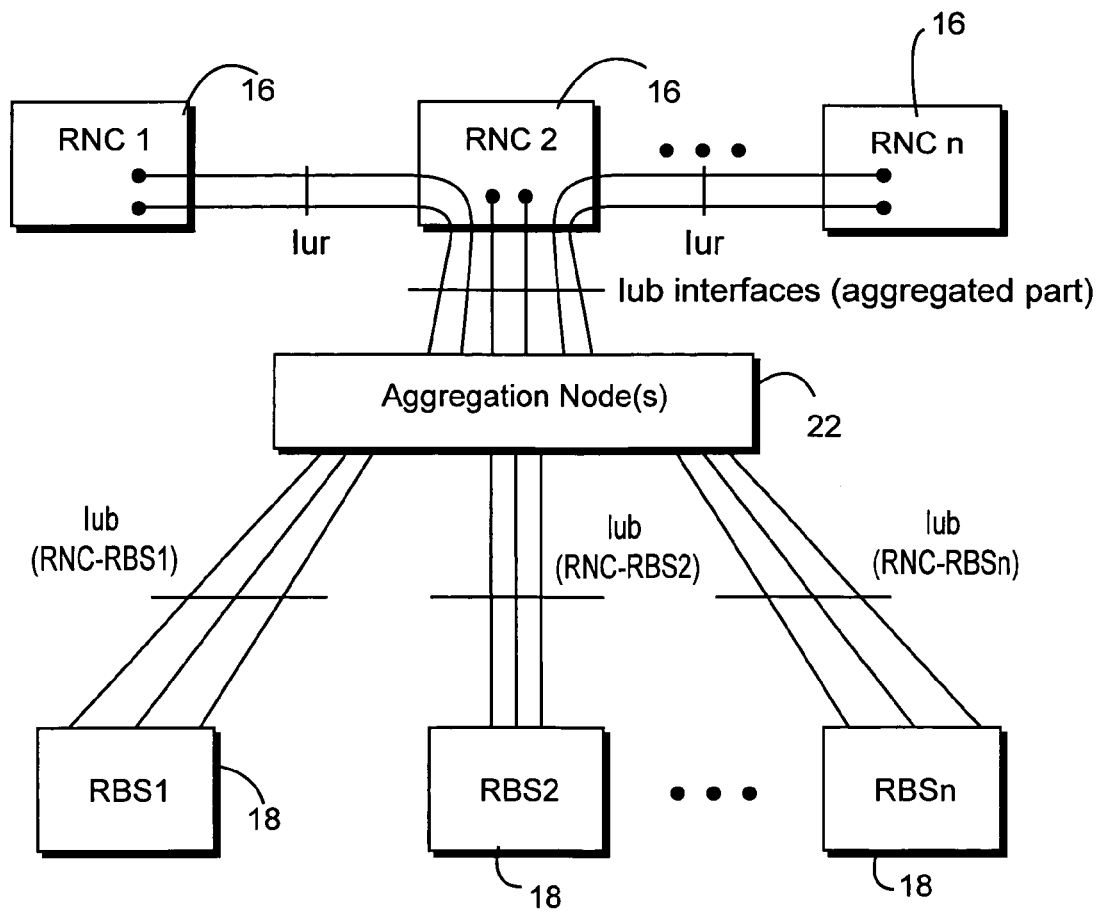
FIG. 4 is a function block diagram illustrating various interfaces between multiple nodes in a radio access network.

As explained above, there is the possibility, particularly with enhanced uplink data communications, that the enhanced uplink bit rate over the air interface exceeds the uplink bandwidth limits for communications between nodes in the radio access network. This point was illustrated in FIG. 1. These kinds of bandwidth restrictions between nodes in a radio access network may only become more significant as radio access networks expand or become more complicated. Consider, for example, the radio access network shown in FIG. 4 in which multiple RNCs (RNC1, RNC2, . . . , RNCn) are coupled to multiple radio base stations (RBS1, RBS2, . . . , RBSn) by way of one or more aggregation nodes 22. The aggregation nodes 22 may be, for example, ATM switches, IP routers, etc. and are optional. Each aggregation node (1) aggregates data traffic from the RBSs to the RNCs and (2) splits the data traffic from the RNCs to the individual RBSs. In this more sophisticated radio access network, there are multiple Iur and Iub interfaces which may have limited bandwidth capability. Some type of congestion control should be in place to avoid congestion, delay, and overload situations caused by receiving uplink data over the radio interface at a rate greater than what can be currently transported over any one of these RAN interfaces.

Figure 5:
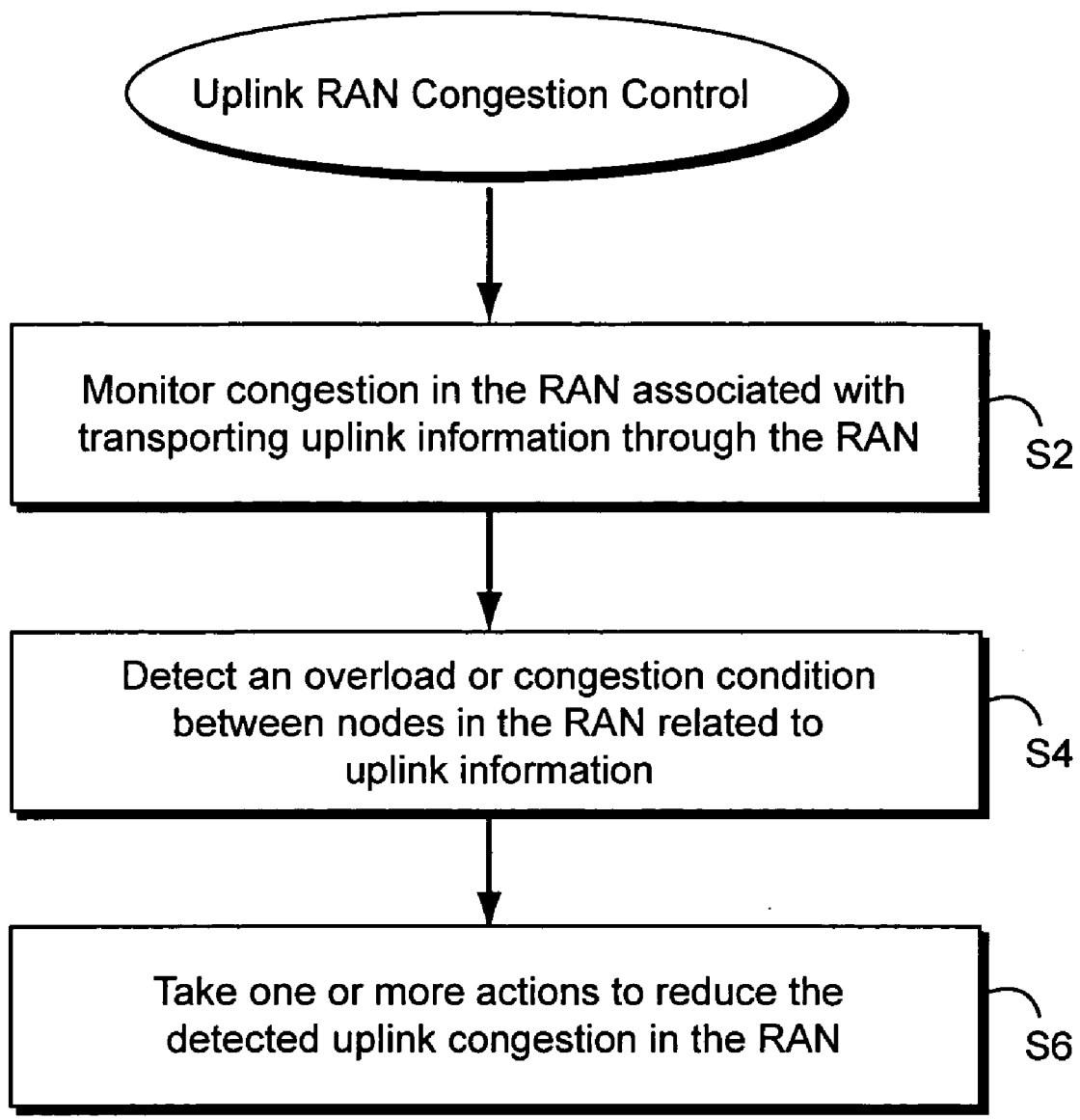
FIG. 5 is a flow chart diagram illustrating example steps for uplink RAN congestion detection and control.

Reference is now made to the flowchart in FIG. 5 which illustrates an uplink RAN congestion control routine. Congestion is monitored in the RAN that is associated with transporting uplink information through the RAN (step S2). An overload or congestion condition is detected between nodes in the RAN related to uplink information for example by detecting frame (or other data unit) losses (step S4). Frame losses may be detected using a frame sequence number (FSN). Each transport bearer between an RNC and a radio base station has its own sequence number. It is assumed that when a frame sequence number is detected as missing, that the corresponding frame is lost due to congestion.

Alternatively, or in addition, delay build-up can be monitored to detect a congestion condition. In transport networks that include large buffers, congestion may not normally result in frame losses, but rather in a build-up of delay time in the buffer before packets are transmitted. Rather than relying on detected frame losses, which may result in severe delays, each user plane frame transmitted from a base station uplink to an RNC includes a field for a real-time stamp, e.g., a control frame number (CFN) plus a subframe number. If the RNC detects a time stamp "drift," meaning that the delay is increasing, the RNC can then determine there is congestion. For example, if uplink frames are delayed more than 30 msec in addition to the delay that is prevailing in non-congested circumstances, this is a good indicator of uplink congestion in the RAN.

Returning to FIG. 5, once an overload or congestion condition is detected, one or more actions is taken to reduce the detected uplink congestion in the RAN (step S6). There are various techniques and implementations for reducing that detected uplink congestion in the RAN. Some non-limiting examples are described below.

Figure 6:
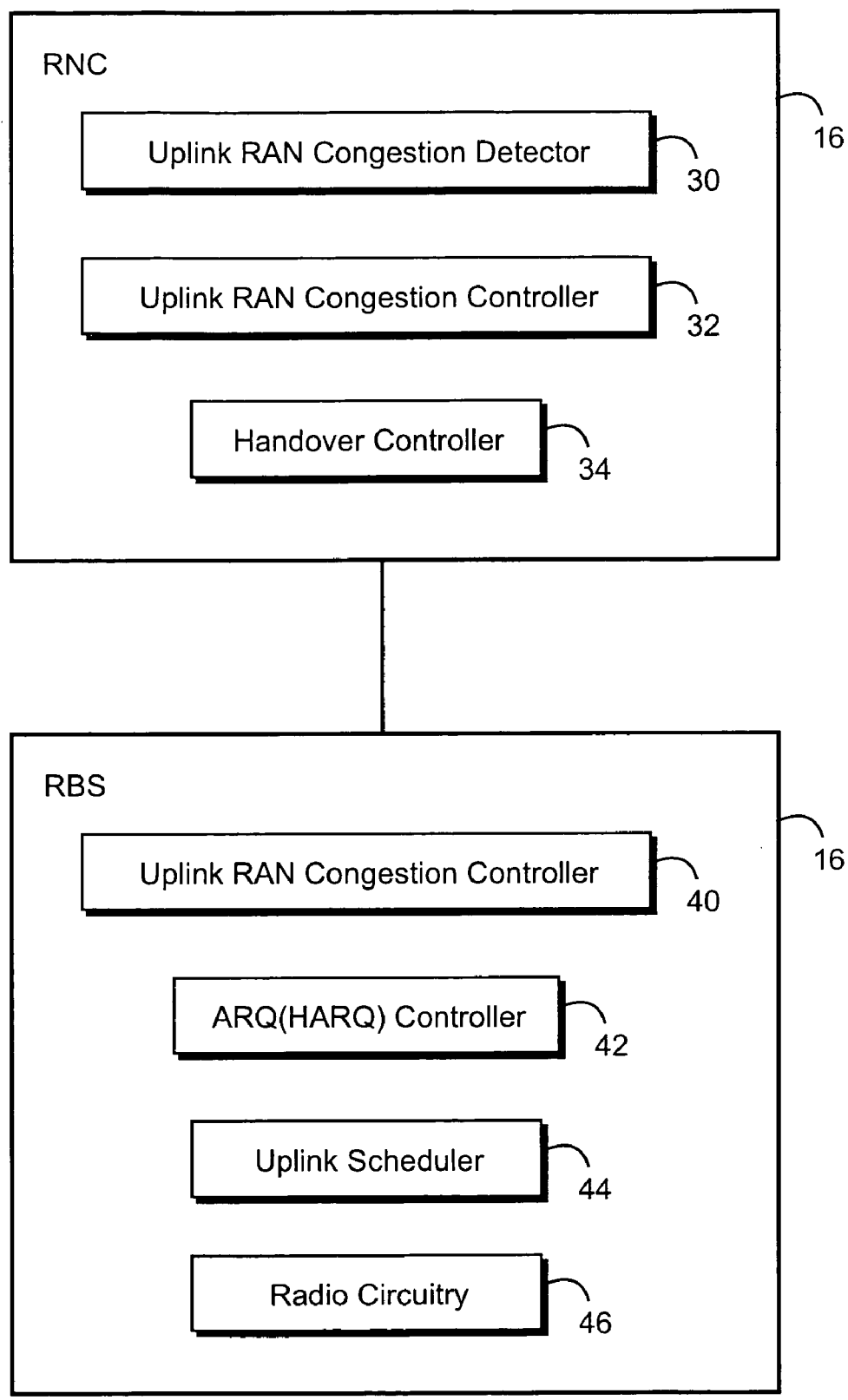
FIG. 6 is a function block diagram illustrating one example implementation for uplink RAN congestion detection and control.

Consider the example implementation shown in FIG. 6 in which both the radio network controller 16 and the radio base station 18 perform certain tasks in reducing uplink RAN congestion. The RNC 16 includes an uplink RAN congestion detector 30 and uplink RAN congestion controller 32, and a handover controller 34. The RNC 16 includes other functional entities which are not pertinent to this description and therefore are not shown. The radio base station 18 includes an uplink RAN congestion controller 40, an automatic repeat request (ARQ) controller 42, (which in a preferred implementation is a hybrid ARQ (HARQ) controller), a mobile terminal uplink scheduler 44, and radio circuitry 46. The radio base station 18 has other entities and circuitry for performing the functions not pertinent to the description and therefore are not shown.

The uplink RAN congestion detector 30 monitors and detects uplink RAN congestion using, for example, frame loss detection or delay build-up detection as described above. Other techniques may be employed. The uplink RAN congestion controller 32 processes congestion detection information provided by detector 30, and based on certain characteristics of one or more congested uplink flows, the uplink RAN congestion controller 32 may decide to limit the uplink load in the RAN using any suitable methodology. For example, the congestion controller 32 may limit a maximum data rate/transmission power grant that the mobile terminal uplink scheduler 44 is allowed to assign to a particular mobile terminal or to a mobile terminal uplink data flow. The mobile terminal subjected to this maximum data rate/power restriction can be the same mobile terminal or data flow which is experiencing the congestion on one or more flows, or it may be a different mobile terminal or data flow, perhaps with a lower priority.

Figure 7:
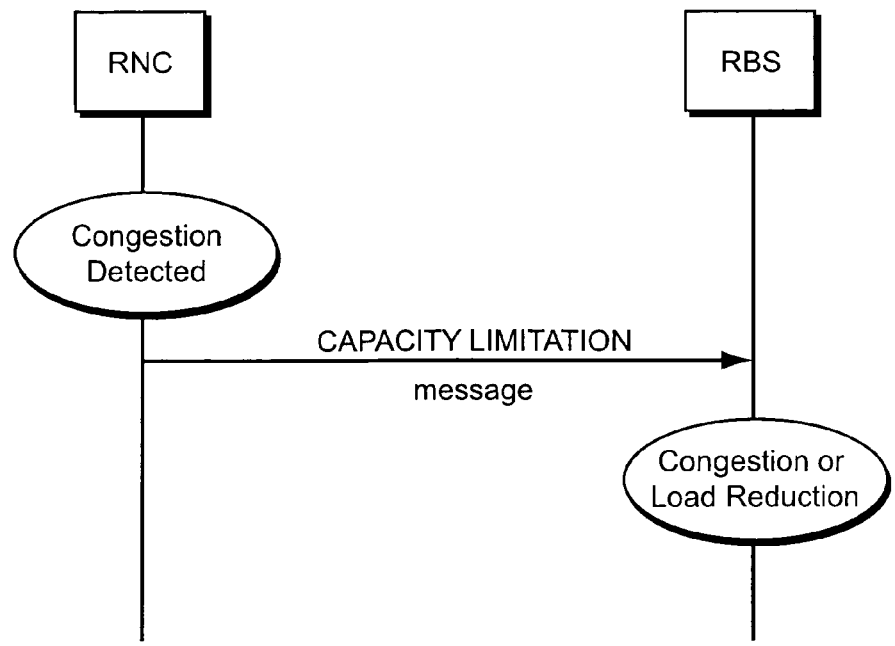
FIG. 7 illustrates a capacity limitation message being sent from the RNC to the radio base station to reduce detected congestion or load in the RAN.

Alternatively, the uplink RAN congestion controller 32 may limit the maximum data rate/transmission power that the uplink scheduler 44 is allowed to assign to a group of mobile terminals. The uplink RAN congestion controller 32 may communicate the maximum data rate/transmission power to the radio base station 18 using a CAPACITY LIMITATION message, as illustrated in FIG. 7. The CAPACITY LIMITATION notification message includes the maximum bit rate/power that the uplink scheduler 44 may assign to one or more mobile terminal uplink flows. The CAPACITY LIMITATION message may also include a time interval over which the maximum bit rate/power restriction applies. On the other hand, the limits may remain in effect until a new capacity limitation message is received. The uplink CAPACITY LIMITATION notification may be sent either in the RAN "user plane" using a control frame embedded with the data or in the RAN "control plane" using control signaling over an explicit control channel. Example control signaling protocols includes Node B Application Part (NBAP)/RNS Application Part/RNSAP).

The maximum bit rate/power may be expressed, for example, as an absolute limit, such as 200 Kbps, or as a prohibition from using a transport format indicator (TFI) exceeding a particular value, such as TFI 12. An example in terms of an absolute transmission power might be a maximum allowed transmission power offset, and an example of a relative limit might be a percentage by which to reduce the current bit rate/power, e.g., 50%. Again, the load may be reduced with respect to the affected mobile terminal, an affected uplink flow, an aggregated load of multiple mobile terminals, or different mobile terminals or different flows that are less prioritized than the affected one(s).

Alternatively, when the uplink RAN congestion controller 40 in the radio base station 18 receives a capacity limitation notification on the uplink RAN congestion controller 32, the congestion controller 40 may limit the scheduling grants assigned to a particular mobile terminal or group of mobile terminals. In a RAN supporting soft-handover, a mobile terminal can be connected to multiple cells controlled by one or several radio base stations. Of the cells in this "active set," the strongest (in terms of a pilot signal) is typically chosen as the "serving cell" responsible for the primary control of the mobile terminal. Via this serving cell, the radio base station can assign absolute grants limiting the maximum bit-rate/power of the mobile terminal. In order to control the inter-cell interference, the radio base stations can also send relative grants via non-serving cells. Relative grants indicate if one or a group of mobile terminals should increase, hold, or decrease their current bit-rate/power. Any of these grants can be based on scheduling requests sent in the uplink from the mobile terminal to the radio base-stations. Such scheduling requests typically include, e.g., the desired bit-rate or the present buffer fill-levels in the mobile terminal.

In the situation where the radio base station controls the serving cell of the mobile terminal, the uplink RAN congestion controller 40 limits the absolute grant of that mobile terminal; alternatively, the uplink RAN congestion controller 40 assigns relative grants (up/hold/down) so that the RNC capacity limitation is fulfilled. The uplink scheduler 44 can provide scheduling information to the mobile terminal to control the upper limit of the mobile terminal transmission data rate/transmission power. The "absolute grant channel" may carry an absolute scheduling grant on a shared channel which includes (a) the identity of the mobile terminal (or a group of mobile terminals) for which the grant is valid and (b) the maximum resources that this mobile terminal (or group of mobile terminals) may use. A "relative grant channel" carries a relative scheduling grant on a dedicated channel and includes at least one bit that registers an incremental up/hold/down. The absolute grant channel is read from the serving cell. The relative grant channel may be read from additional cells, e.g., in the case of soft handover, from all cells in the active set. If a mobile terminal is assigned to read the relative grant channel from a set of cells, the mobile terminal must not increase its data rate or power offset if any cell in the active set signals a hold. Similarly, if any of the cells relative grants is set to down, the mobile terminal must decrease the rate or power offset with some predefined step size. When the radio base station does not control the mobile terminal serving cell, the uplink RAN congestion controller 40 assigns relative grant indications (up/hold/down) to fulfill the RNC capacity limitation.

As another alternative already explained above, the uplink RAN congestion controller 40 may discard RAN data frames so that the RAN capacity limitation assigned by the RNC is fulfilled without affecting scheduling grants. Rather than discarding frames, the uplink RAN congestion controller 40 may instruct the HIARQ controller 42 to send a NACK message for each received and discarded data unit back to the mobile terminal. NACKing the discarded data frames from a non-serving cell triggers re-transmission of those discarded data frames, unless some other link has received those data frames correctly. The effect is reduced pressure on the RAN transport.

It is possible that the sending of capacity limitation control frames to inform the uplink RAN congestion controller 40 to lower the bit rate/transmission power relative to the normal bit rate/transmission power per HSUPA flow will result in the following behavior. If the uplink scheduler 44, which controls the HSUPA flow bit rates, lowers the flow bit rate from one of the mobile terminals by modifying its scheduling grants, it is likely that the uplink scheduler 44 will schedule another mobile terminals to transmit in its place. Moreover, it is likely that the mobile terminal associated with RAN congestion has excellent uplink radio/air interface performance. Therefore, scheduling another mobile instead of the congested mobile to transmit in the uplink should reduce the congestion of the uplink RAN congested flows.

After recovery from a congestion condition, as detected by the uplink RAN congestion detector 30, the uplink RAN congestion controller 32 may restore the original data rate or transmission power by sending notification to the radio base station. Alternatively, and as explained above, a configurable or predefined period of time may be set after which the temporary restriction on the uplink scheduler 44 is released. This latter approach may be preferred because explicit signaling from the RNC is not required.

Figure 8:
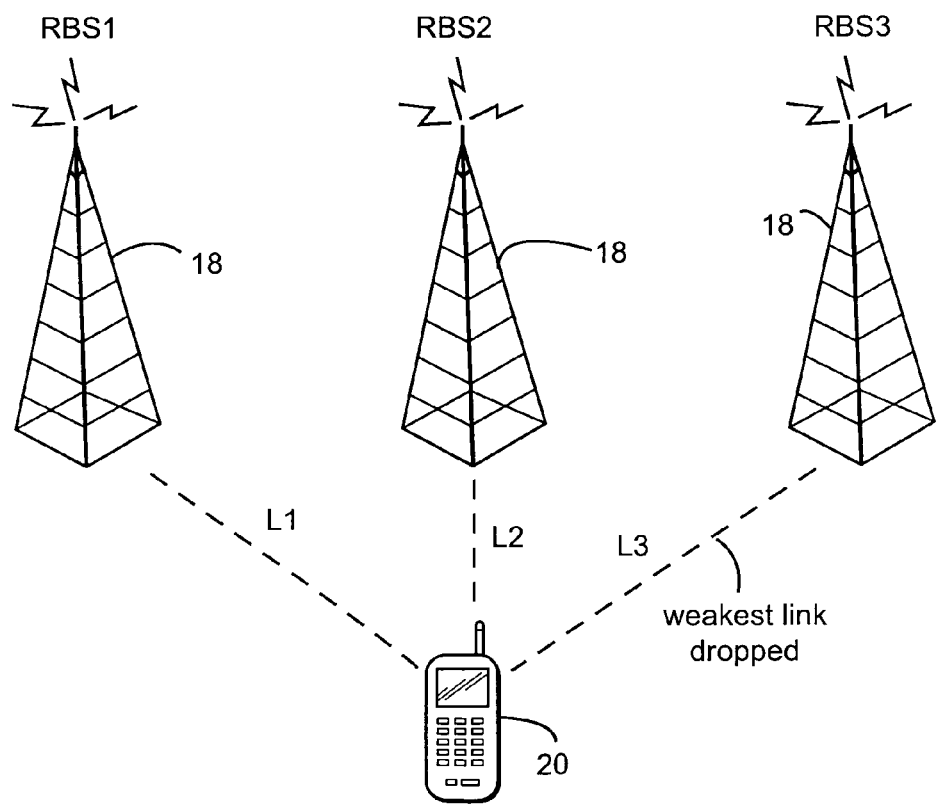
FIG. 8 is a diagram illustrating a mobile terminal in soft handover in which a weaker soft handover leg is dropped in order to reduce uplink RAN congestions.

Consider a situation in which the mobile terminal 20 that is subject to RAN congestion is in soft handover, as illustrated in FIG. 8. In this example, mobile terminal 20 has three soft handover links L1, L2, and L3 to three base stations RBS1, RBS2, and RBS3, respectively. Assume that the congested radio link L3 is not the "serving" handover link. Typically, the serving link is the strongest one of the handover links based on detected signal strength measurements. The uplink RAN congestion controller 32 may decide to release the weaker handover radio link L3, which is subject to congestion in the RAN, and leave links L1 and L2. This congestion reduction approach has the benefit of not affecting the bit rate over the radio interface. Any capacity loss associated with loss of macro-diversity over the air interface is less impacting than the RAN congestion associated with link L3.

The RAN Iub and Iur interfaces each likely have a maximum total uplink bandwidth. A certain, relatively small amount of each maximum bandwidth is allocated for control signaling. The rest of the remaining bandwidth may be divided as desired between uplink dedicated data channels (X) and enhanced uplink dedicated data channels (Y), where the remaining bandwidth=(X+Y). When the RNC detects uplink congestion over one of the interfaces, it sends a message to the RBS to reduce the enhanced uplink dedicated data channels bandwidth by a certain percentage selected to reduce the congestion without impacting the enhanced uplink services too much. When the congestion condition is alleviated or after a predetermined time period, the enhanced uplink dedicated data channels bandwidth may be restored to Y.

The above technology solves the problem of uplink RAN congestion without having to over-provision the RAN transport network. The RAN congestion is reduced by adapting the uplink mobile transmissions load to the current uplink RAN resource situation. In other words, the data frame bit rate in the RAN can be adapted to present RAN bandwidth restrictions. As a result, the data frame delays and losses can be minimized even where the uplink radio interface could provide higher bit rates than what the RAN transport network can offer.

Although various embodiments have been shown and described in detail, the claims are not limited to any particular embodiment. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for managing an overload or congestion condition between nodes in a radio access network (RAN), comprising:

monitoring for congestion in the RAN caused by transporting information between a base station and a radio network controller or two radio network controllers contained in the RAN;

detecting congestion over a base station-to-radio network controller interface or a radio network controller-to-radio network controller interface within the RAN, said congestion being caused by transporting the information between a base station and a radio network controller or two radio network controllers contained in the RAN; and reducing the detected congestion over the base station-to-radio network controller interface or the radio network controller-to-radio network controller interface within the RAN caused by transporting the information between a base station and a radio network controller or two radio network controllers contained in the RAN, wherein mobile terminals that can request service from the RAN over a radio interface are not nodes contained within the RAN, and wherein the RAN includes a first radio network controller coupled to a radio base station, and wherein the radio network controller detects uplink congestion over the base station and a radio network controller interface between the radio network controller and the radio base station, wherein the reducing the detected congestion includes taking an action to reduce a parameter associated with a bit rate at which the information is transported over the base station and radio network controller interface, and wherein the bit rate parameter is reduced based on an absolute bit rate parameter value or on a relative bit rate parameter value, wherein the absolute bit rate parameter value corresponds to a maximum bit rate or transmission rower and the relative bit rate parameter value corresponds to a percentage or fraction of a current bit rate or transmission power.

2. The method in claim 1, wherein the RAN includes the first radio network controller coupled to a second radio network controller, and wherein one of the radio network controllers detects uplink congestion over an interface between the first and second radio network controllers.

3. The method in claim 1, wherein mobile terminal information is communicated to the RAN over the radio interface using uplink data flows, and wherein the bit rate parameter is reduced by reducing a bit rate of one or more uplink data flows.

4. The method in claim 1, wherein the bit rate parameter is reduced by sending control information in a control plane or in a user data plane.

5. The method in claim 1, wherein the bit rate parameter is reduced using scheduling grants or credits for uplink mobile terminal communications.

6. The method in claim 1, wherein the bit rate parameter is reduced by dropping one or more frames of one or more uplink mobile terminal communications.

7. The method in claim 1, wherein the bit rate parameter is reduced by releasing one or more diversity handover radio links.

8. A method according to claim 1
wherein the information is conveyed as a series of frames, and
wherein the congestion in the RAN is indicated by a frame delay or a frame loss occurring in the RAN.

9. The method in claim 8, wherein the detected frame loss is detected by analyzing frame sequence numbers or the detected frame delay is detected by analyzing frame time stamps for delay.

10. The method in claim 8, wherein the congestion in the RAN is detected based on a frame delay in the RAN exceeding a delay threshold or a frame loss occurring in the RAN exceeding a frame loss delay threshold.

11. The method in claim 1, wherein the congestion in the RAN is different from congestion in a cell service area associated with the base station.

12. The method in claim 1, wherein mobile terminals may transmit the information over a radio interface to the RAN using one or more enhanced uplink dedicated channels (E-DCHs).

13. A method for managing an overload or congestion condition between nodes in a radio access network (RAN), comprising:
monitoring for congestion in the RAN caused by transporting information between a base station and a radio network controller or two radio network controllers contained in the RAN;
detecting congestion over a base station-to-radio network controller interface or a radio network controller-to-radio network controller interface within the RAN, said congestion being caused by transporting the information between a base station and a radio network controller or two radio network controllers contained in the RAN; and
reducing the detected congestion over the base station-to-radio network controller interface or the radio network controller-to-radio network controller interface within the RAN caused by transporting the information between a base station and a radio network controller or two radio network controllers contained in the RAN,
wherein mobile terminals that can request service from the RAN over a radio interface are not nodes contained within the RAN,
wherein the RAN includes a first radio network controller coupled to a radio base station, and wherein the radio network controller detects uplink congestion over the base station and a radio network controller interface between the radio network controller and the radio base station,
wherein a first amount of bandwidth allocated to uplink dedicated channels and a second amount of bandwidth is allocated to enhanced uplink dedicated channels, and wherein the radio network controller sends a message to the radio base station to reduce the second amount of bandwidth when uplink congestion is detected in the RAN.

14. Apparatus for use in managing an overload or congestion condition between nodes contained in a radio access network (RAN), comprising:
a congestion detector for monitoring and detecting congestion on a link between two nodes contained in the RAN, where mobile terminals which receive service from the RAN are not nodes contained within the RAN, said congestion being caused by transporting the information on the link between the two nodes in the RAN, and
a congestion controller for reducing the detected congestion on the link between the two nodes contained in the RAN associated with transporting the information on the link between the two nodes contained in the RAN,
wherein the congestion controller is configured to reduce a parameter associated with a bit rate at which uplink mobile terminal information is transported through the RAN, and
wherein the congestion controller is configured to send an absolute bit rate parameter value or a relative bit rate parameter value for use by the radio base station to reduce a bit rate or power of one or more uplink mobile terminal transmissions,
wherein the absolute bit rate parameter value corresponds to a maximum bit rate or transmission power and the relative bit rate parameter value corresponds to a percentage or fraction of a current bit rate or transmission power.

15. The apparatus in claim 14, wherein the two nodes contained in the RAN include a first radio network controller coupled to a radio base station.

16. The apparatus in claim 14, wherein the two nodes in the RAN include a first radio network controller coupled to a second radio network controller, and wherein one of the radio network controllers is configured to detect congestion over an interface between the first and second radio network controllers.

17. The apparatus in claim 14, wherein the information is based on uplink data flows, and wherein the congestion controller is configured to send a signal to the radio base station to reduce a bit rate of one or more uplink data flows.

18. The apparatus in claim 14, wherein the congestion controller is configured to reduce the bit rate parameter by sending control information in a control plane or in a user data plane to the radio base station.

19. The apparatus in claim 14, wherein the congestion controller is configured to send a signal to the radio base station to restrict scheduling of one or more uplink transmission grants or credits.

20. The apparatus in claim 14, wherein the congestion controller is configured to release one or more diversity handover radio links to reduce the detected congestion.

21. The apparatus in claim 14, wherein a first amount of bandwidth allocated to uplink dedicated channels and a second amount of bandwidth is allocated to enhanced uplink dedicated channels, and wherein the radio network controller is configured to send a message to the radio base station to reduce the second amount of bandwidth when uplink congestion is detected in the RAN.

22. The apparatus in claim 15, wherein the information includes a series of frames, and wherein the detected congestion in the RAN is indicated by a detected frame delay in the RAN exceeding a delay threshold or by a detected frame loss occurring in the RAN exceeding a frame loss delay threshold.

23. The apparatus in claim 22, wherein the detected frame loss is based on analyzed frame sequence numbers or the detected frame delay is based on analyzed frame time stamps.

24. The apparatus in claim 14, wherein the congestion in the RAN is different from congestion in a cell service area associated with the base station.

25. The apparatus in claim 14, wherein the RAN is configured to receive over a radio interface the information using one or more enhanced uplink dedicated radio channels (E-DCHs).

26. Apparatus for use in managing an overload or congestion condition in a radio access network (RAN) associated with transporting information in the RAN, comprising:

a scheduler for scheduling uplink transmissions from one or more mobile terminals, and a congestion controller, coupled to the scheduler, for reducing congestion over a base station-to-base station interface, a base station-to-radio network controller interface, or a radio network controller-to-radio network controller interface within the RAN, said congestion being caused by transporting the information between two base stations, a base station and a radio network controller, or two radio network controllers contained within the RAN, wherein mobile terminals which receive service from the RAN are not contained within the RAN, and wherein the congestion controller is configured to receive one or more messages from a radio network controller in the RAN including information associated with reducing congestion in the RAN associated with transporting through the RAN the information received via an uplink radio interface from mobile terminals over one or more enhanced uplink dedicated channels (E-DCHs), wherein the congestion controller is configured to reduce a bit rate or power associated with one or more uplink mobile terminal communications using negative acknowledgement messages.

27. The apparatus in claim 26, wherein the congestion controller is configured to instruct the scheduler to restrict uplink transmission grants or credits provided to the one or more mobile terminals.

28. The apparatus in claim 26, wherein the congestion controller is configured to drop one or more frames associated with one or more uplink mobile terminal communications.

29. The apparatus in claim 26, wherein the congestion in the RAN is different from congestion in a cell service area associated with the base station.

* * * * *

UNITED STATES PATENT AND TRADEMARK OFFICE
CERTIFICATE OF CORRECTION

PATENT NO. : 7,724,656 B2  Page 1 of 1
APPLICATION NO. : 11/035021
DATED : May 25, 2010
INVENTOR(S) : Sågfors et al.

It is certified that error appears in the above-identified patent and that said Letters Patent is hereby corrected as shown below:

On the Title Page:
On Page 2, in Field (56), under "OTHER PUBLICATIONS", in Column 2, Line 6, delete "2005." and insert -- 2005-06. --, therefor.

In Column 7, Line 21, delete "HIARQ" and insert -- H/ARQ --, therefor.

In Column 9, Line 5, in Claim 1, delete "rower" and insert -- power --, therefor.

Signed and Sealed this

Fifth Day of October, 2010

David J. Kappos
*Director of the United States Patent and Trademark Office*